United States Patent
Wilkes

(10) Patent No.: US 11,945,496 B2
(45) Date of Patent: Apr. 2, 2024

(54) STEERING COLUMN ASSEMBLY

(71) Applicant: TRW Limited, Solihull (GB)

(72) Inventor: Mark Anthony Wilkes, Solihull (GB)

(73) Assignee: ZF Automotive UK Limited

( * ) Notice: Subject to any disclaimer, the term of this patent is extended or adjusted under 35 U.S.C. 154(b) by 778 days.

(21) Appl. No.: 16/578,479

(22) Filed: Sep. 23, 2019

(65) Prior Publication Data

US 2020/0172150 A1 Jun. 4, 2020

(30) Foreign Application Priority Data

Nov. 29, 2018 (GB) ...................... 1819463

(51) Int. Cl.
*B62D 1/20* (2006.01)
*B62D 5/04* (2006.01)

(52) U.S. Cl.
CPC ............. *B62D 1/20* (2013.01); *B62D 5/0409* (2013.01); *B62D 5/0442* (2013.01); *B62D 5/0457* (2013.01); *B62D 5/0469* (2013.01); *F16C 2326/24* (2013.01)

(58) Field of Classification Search
CPC ...... B62D 1/20; B62D 5/0409; B62D 5/0442; B62D 5/0457; B62D 5/0469; B62D 5/001; B62D 5/006; B62D 5/0463; B62D 7/224; F16C 2326/24
USPC ....................................... 180/443
See application file for complete search history.

(56) References Cited

U.S. PATENT DOCUMENTS

| 2018/0106693 A1* | 4/2018 | Pattok .................. B62D 5/0406 |
| 2018/0238377 A1* | 8/2018 | Kim ....................... B62D 5/001 |
| 2018/0346014 A1* | 12/2018 | Beyerlein ............ B62D 5/0409 |
| 2019/0100232 A1 | 4/2019 | Tsukasaki |

FOREIGN PATENT DOCUMENTS

| CN | 106585707 A | 11/2016 |
| JP | 2006015865 A | 7/2004 |
| JP | 2009078792 A | 9/2007 |
| JP | 2010159040 A | * | 7/2010 |
| JP | 2010159040 A | | 7/2010 |
| WO | 2017033884 A1 | 3/2017 |

* cited by examiner

*Primary Examiner* — Scott A Reinbold
(74) *Attorney, Agent, or Firm* — Robert James Harwood

(57) ABSTRACT

A steering column assembly for a vehicle includes a housing, a shaft, a first gear, first and second motors. The shaft is rotatably mounted with respect to the housing and is configured for attachment of a steering wheel at one end. The first gear is connected to and configured to rotate with the shaft. Each of the first and second motors have an output driving a respective output gear. The output gears are engaged with the first gear, and there being control means configured to operate the motors in a first mode in which the motors apply torque to the first gear in opposite directions and a second mode in which the motors apply torque to the first gear in the same direction.

20 Claims, 2 Drawing Sheets

STEERING COLUMN ASSEMBLY

CROSS-REFERENCE TO RELATED APPLICATIONS

This application claims priority to UK Patent Application No. 1819463.9, filed on Nov. 29, 2018 the disclosure of which is incorporated herein by reference in its entirety.

TECHNICAL FIELD

The present invention relates to steering column assemblies and in particular, but not exclusively, to steering column assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering wheel (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle. The arrangement is commonly also provided with an electric motor connected to the shaft in order to provide a sensation of road feel to the driver.

In such arrangements, an electric motor typically drives a worm screw engaged with a worm gear which rotates with the shaft to which the steering wheel is connected. It is desirable to take steps to bias the worm screw into engagement with the worm gear in order to reduce gear rattle which occurs when the torque and direction of the motor are reversed.

In accordance with a first aspect of the present invention, a steering column assembly for a vehicle comprises a housing, a shaft rotatably mounted with respect to the housing and being configured for attachment of a steering wheel at one end, a first gear connected to and configured to rotate with the shaft, and first and second motors, each having an output driving a respective output gear, the output gears being engaged with the first gear, the assembly further comprising control means configured to operate the motors in a first mode in which the motors apply torque to the first gear in opposite directions and a second mode in which the motors apply torque to the first gear in the same direction.

With such an arrangement, it is possible to use both motors in the second mode to power the first gear in order to provide force feedback to the driver at a desired level. On reversal in the first mode, the motors are operated to apply torque in opposite directions for sufficient time to eliminate gear rattle. Preferably, the first gear comprises a worm gear and each of the output gears comprises a worm screw. Preferably, the rotational axes of the two worm screws are inclined with respect to each other, and the rotational axes of the two worm screws preferably also extend perpendicularly to the rotational axes of the first gear. This reduces the overall size of the assembly, which facilitates fitting it within a relatively limited volume within the vehicle. Preferably, the motors are located within the housing.

In a preferred embodiment, the motors are substantially identical. In addition, preferably the output gears are also substantially identical, A further problem occurs with steer-by-wire arrangements, arising from the fact that the vehicle wheels are not physically connected to the steering wheel, in contrast to a conventional mechanical steering wheel arrangement. The steered wheels can only pivot through a given range of motion, and it is therefore important to limit the maximum rotation of the steering wheel so that it corresponds to the maximum extent of pivoting of the steered wheels, otherwise a driver of the vehicle would be able to rotate the steering wheel indefinitely when the steered wheels are at their maximum steering angle.

Therefore, in accordance with a second aspect of the present invention, a steering column assembly for a vehicle comprises a housing, a shaft rotatably mounted with respect to the housing and being configured for attachment of a steering wheel at one end, a threaded elongate member connected to and configured to rotate with the shaft, a nut threadedly engaged with the threaded elongate member and being non-rotatable with respect to the housing whereby rotation of the shaft causes the nut to be displaced along the threaded elongate member, and two abutment means spaced apart in the longitudinal direction of the threaded elongate member and being engageable with the nut to determine the two extreme positions of the nut along the threaded elongate member.

With such an assembly, by coordinating the two extreme positions of the nut with the maximum extent of pivoting of the steered wheels to the left and right respectively, it is possible to limit the maximum rotation of the steering wheel in both directions to correspond to the maximum deflection of the steered wheels to the left and right respectively.

In a preferred embodiment, the nut comprises a projection engageable with an elongate recess in the housing which extends parallel to the rotational axis of the threaded elongate member. More preferably, the nut comprises a plurality of projections (for example two projections), each engageable with a respective elongate recess in the housing which extends parallel to the rotational axis of the threaded elongate member.

In a preferred embodiment, the nut comprises two projections. Conveniently, the projections may be diametrically opposite each other with respect to the rotational axis of the threaded elongate member. Preferably, resiliently deformable means are provided to cushion the engagement of the nut with the two abutment means.

This feature ensures that the driver does not feel a hard engagement when the nut reaches one of its two extreme positions. Conveniently, the resiliently deformable means may be mounted on the two abutment means.

For example, the resiliently deformable means may comprise elastic members located on the two abutment means.

BRIEF DESCRIPTION OF THE DRAWINGS

By way of example only, a specific embodiment of the present invention will now be described with reference to the accompanying drawings, in which.

DETAILED DESCRIPTION

Figure 1:
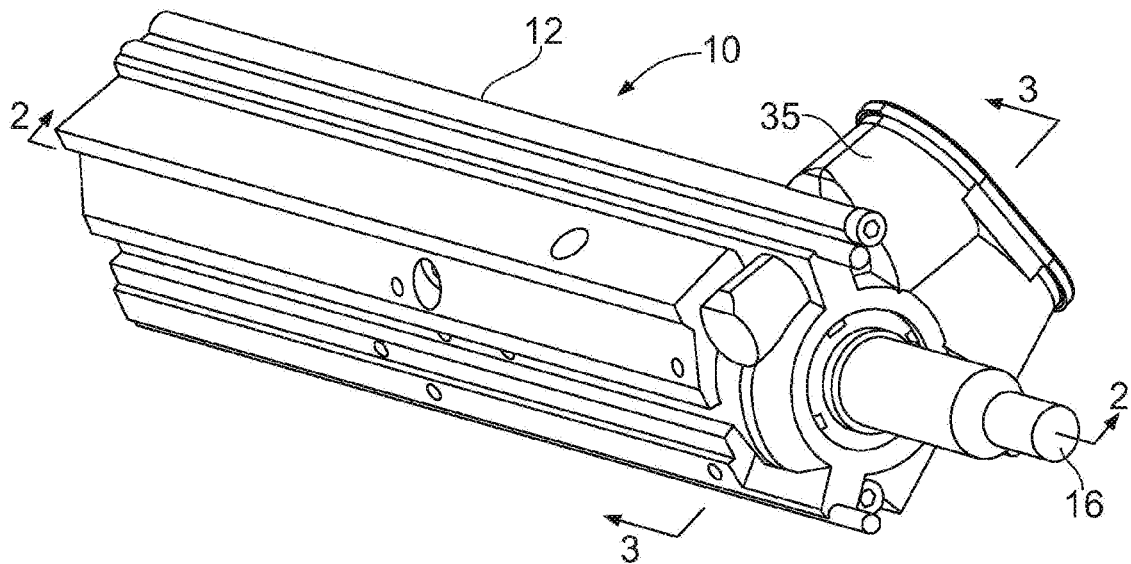
FIG. 1 is a perspective view of an embodiment of steer-by-wire hand wheel actuator in accordance with the present invention.

A steer-by-wire hand wheel actuator 10 comprises an external elongate metal housing 12 which encloses an elongate void 14. A shaft 16 to which a steering wheel (not shown) is connected passes through one end of the metal housing 12 and the end of the shaft is radially supported on bearing 18 located at one end of the housing 12 and is secured in position by means of a threaded lock ring 20.

A gear wheel 22 is secured to the end of the shaft 16 between the bearings 18 and the threaded lock ring 20 and rotates with the shaft 16. The periphery of the gear wheel 22 is formed as a worm gear which meshes with each of two identical worm screws 24, 26 located on opposite sides of the longitudinal axis of the shaft 16. Each worm screw 24, 26 is connected to the output shaft 28, 30 of a respective electric motor 32, 34.

Figure 2:
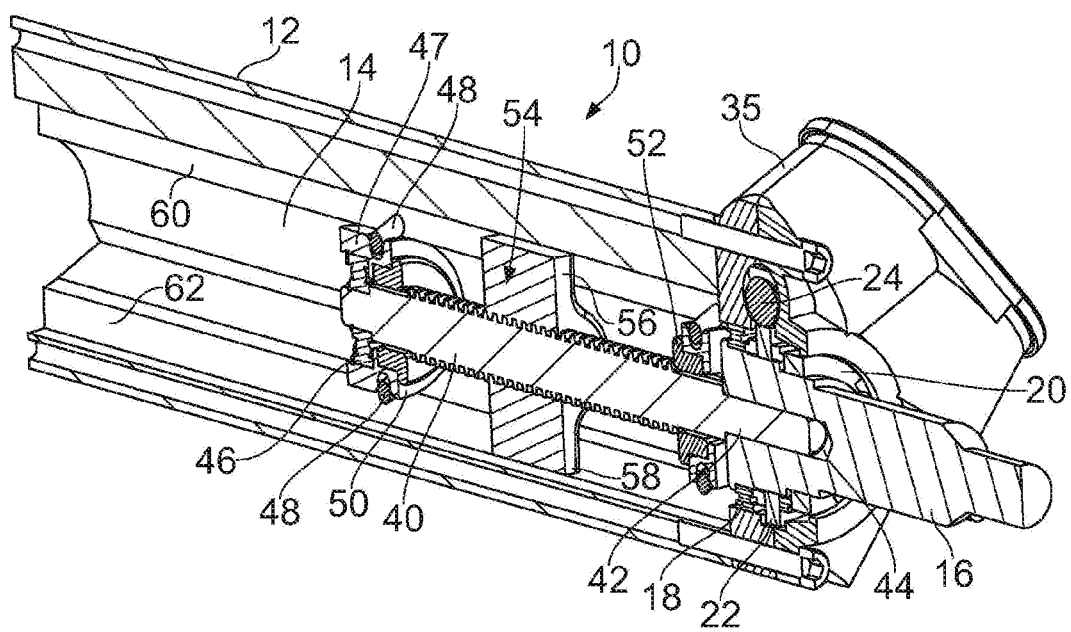
FIG. 2 is a perspective view of an embodiment of the steer-by-wire hand wheel actuator of FIG. 1, partly in cross-section, looking in the direction of arrows 2-2 of FIG. 1.
Figure 3:
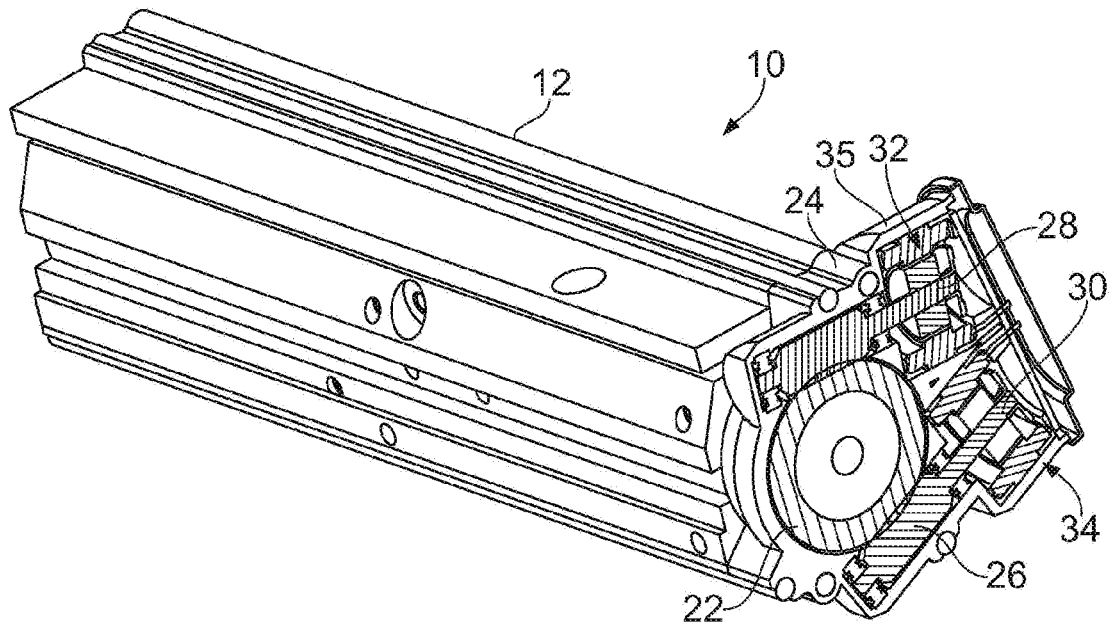
FIG. 3 is a perspective view, partly in cross-section, of the steer-by-wire hand wheel actuator of FIG. 1, looking in the direction of arrows 3-3 of FIG. 1.
Figure 4:
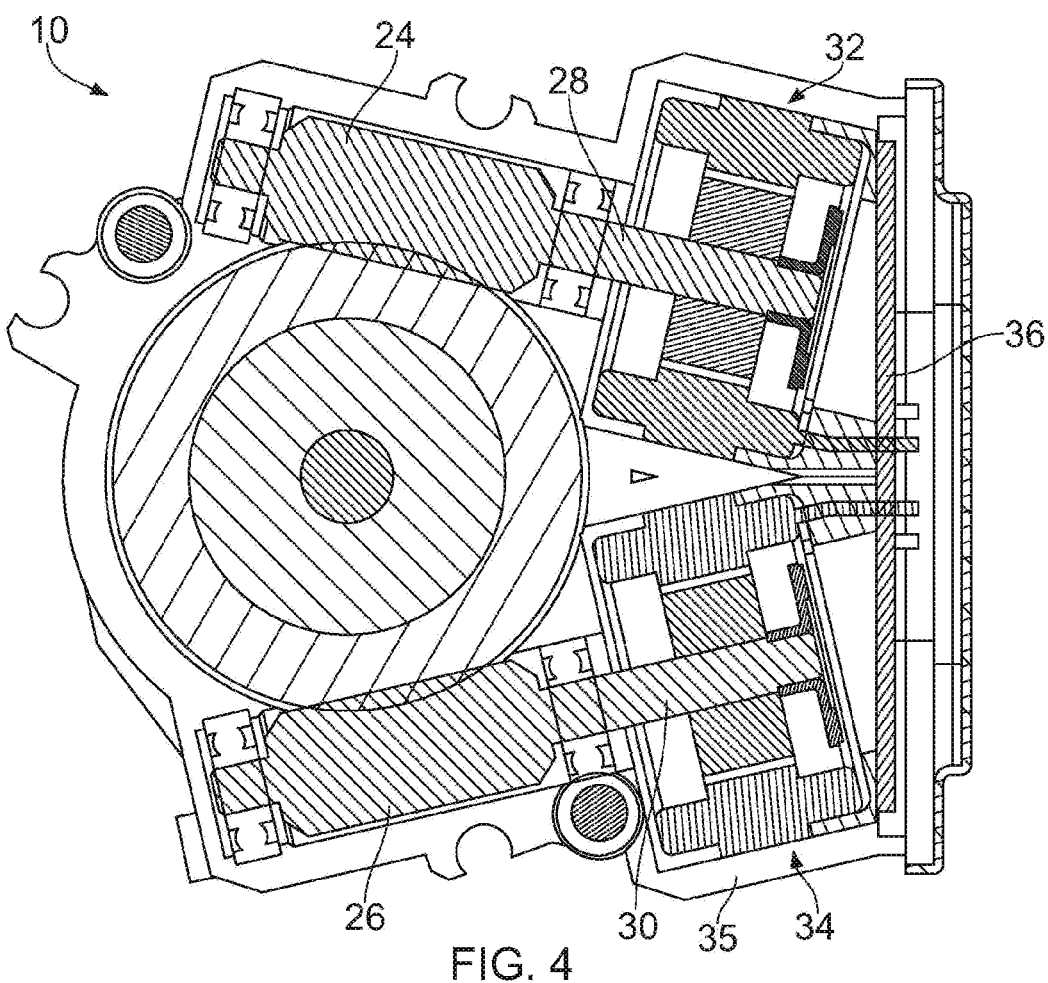
FIG. 4 is a longitudinal cross-section through the steer-by-wire hand wheel actuator of FIG. 1, looking in the direction of arrows 3-3 of FIG. 1.

The axes of the output shafts 28, 30 of the two motors 32, 34 are arranged perpendicularly to the rotational axis of the shaft 16 and, as best seen in FIGS. 2 and 4, the axes of the two motors may also be inclined with respect to each other, in order to reduce the overall size of the assembly. As best seen in FIGS. 1 and 2, the motors 32, 34 are received in a transversely-extending two-part extension 35 of the housing 12.

The motors 32, 34 are controlled by an electronic control unit (ECU) mounted on a board 36 inside the two-part housing extension 35 so that at low levels of input torque applied to the shaft 16 by the steering \A/heel, they act in opposite directions on the gear wheel 22 so as to eliminate backlash. At higher levels of input torque applied to the shaft 16 by the steering wheel, the motors 32, 34 act in the same direction on the new wheel to assist in rotation of the shaft 16.

The use of two separate motors 32, 34 which can be controlled in a first operational mode to apply torque in opposite directions to the gear 22 eliminates the need to control backlash with precision components. In addition, the use of two separate motors 32, 34 which can be controlled in a second operational mode to apply torque in the same direction to the gear 22 allows the motors and gear components to be specified at half the rating of the required total system torque, thereby reducing the size and cost of the assembly.

As best seen in FIG. 2, a rotatably mounted elongate leadscrew 40 is located within the housing 12 and is aligned with the rotational axis of the shaft 16. The outermost end 42 of the leadscrew 40 is received in a recess 44 in the end of the shaft 16 and the two are keyed together so that they rotate with each other. The leadscrew 40 is rotatably mounted at its inner end on bearing 46 fitted within the housing ring 47, and annular rubber end stops 50, 52 are fitted to the two ends of the leadscrew 40. The housing ring 47 is rigidly attached to the housing 12 by pins 48.

The leadscrew 40 is externally threaded for most of its length and a leadscrew nut 54 is threadedly received on the leadscrew 40. The leadscrew nut 54 is provided with two diametrically opposed projections 56, 58 which are slidably engaged with respective complementarily-shaped elongate slots 60, 62 which are extensions of the elongate void 14.

Rotation of the shaft 16 by means of the steering wheel causes the leadscrew 40 to rotate which in turn displaces the leadscrew nut 54 to be displaced longitudinally, as guided by the slots 60, 62. However, the maximum displacement of the leadscrew nut 54 in either direction is limited by engagement with the rubber end stops 50, 52, which limits the angular rotation of the steering wheel. The rubber end stops 50, 52 cushion the contact with the leadscrew nut 54.

The invention is not restricted to the details of the foregoing embodiment.

What is claimed is:

1. A steering column assembly for a vehicle, comprising a housing, a shaft rotatably mounted with respect to the housing and being configured for attachment of a steering wheel at one end, a first gear connected to and configured to rotate with the shaft, and first and second motors, each of the first and second motors having an output shaft directly connected to and driving a respective output gear, each of the output gears being directly engaged with the first gear, the first and second motors applying torque to the first gear in opposite directions in a first operating mode, the first and second motors applying torque to the first gear in the same direction in a second operating mode.

2. A steering column assembly as claimed in claim 1, wherein the first gear comprises a worm gear and each of the output gears comprises a worm screw.

3. A steering column assembly as claimed in claim 2, wherein the rotational axes of the two worm screws are inclined with respect to each other.

4. A steering column assembly as claimed in claim 3, wherein the rotational axes of the two worm screws extend perpendicularly to the rotational axis of the first gear.

5. A steering column assembly as claimed in claim 1, wherein the motors are identical.

6. A steering column assembly as claimed in claim 1, wherein the output gears are identical.

7. A steering column assembly for a vehicle, comprising a housing, a shaft rotatably mounted with respect to the housing and being configured for attachment of a steering wheel at one end, a leadscrew connected to and configured to rotate with the shaft, a nut threadedly engaged with the leadscrew and being non-rotatable with respect to the housing whereby rotation of the shaft causes the nut to be displaced along the leadscrew, and two end stops spaced apart in the longitudinal direction of the leadscrew and being engageable with the nut to determine the two extreme positions of the nut along the leadscrew, the nut comprising a projection engageable with an elongate recess in the housing that extends parallel to a rotational axis of the leadscrew.

8. A steering column assembly as claimed in claim 7, wherein the nut comprises a plurality of projections, each engageable with a respective elongate recess in the housing which extend parallel to the rotational axis of the leadscrew.

9. A steering column assembly as claimed in claim 8, wherein the nut comprises two projections.

10. A steering column assembly as claimed in claim 9, wherein the projections are diametrically opposite each other with respect to the rotational axis of the leadscrew.

11. A steering column assembly as claimed in claim 9, wherein the end stops are rubber end stops.

12. A steering column assembly as claimed in claim 1, wherein a housing extension extends transversely from the housing, each of the first and second motors being located in the housing extension.

13. A steering column assembly as claimed in claim 1, wherein each of the first and second motors is located in the housing.

14. A steering column assembly as claimed in claim 1, wherein each output shaft has a rotational axis coaxial with a corresponding one of the output gears.

15. A steering column assembly for a vehicle, comprising:
- a housing;
- a shaft rotatably mounted with respect to the housing and being configured for attachment of a steering wheel at one end;
- a leadscrew connected to and configured to rotate with the shaft;
- a nut threadedly engaged with the leadscrew and being non-rotatable with respect to the housing whereby rotation of the shaft causes the nut to be displaced along the leadscrew;
- two end stops spaced apart in the longitudinal direction of the leadscrew and engageable with the nut to determine the two extreme positions of the nut along the leadscrew;
- a first gear connected to and configured to rotate with the shaft; and
- first and second motors each having an output driving a respective output gear, the output gears being engaged with the first gear, the first and second motors applying torque to the first gear in opposite directions in a first operating mode, the first and second motors applying torque to the first gear in the same direction in a second operating mode.

16. A steering column assembly as claimed in claim 15, wherein the nut comprises a projection engageable with an elongate recess in the housing that extends parallel to a rotational axis of the leadscrew.

17. A steering column assembly as claimed in claim 15, wherein the nut comprises a plurality of projections, each engageable with a respective elongate recess in the housing which extend parallel to a rotational axis of the leadscrew.

18. A steering column assembly as claimed in claim 15, wherein the end stops are rubber end stops.

19. A steering column assembly as claimed in claim 15, wherein the rotational axes of the two worm screws are inclined with respect to each other.

20. A steering column assembly as claimed in claim 15, wherein the rotational axes of the two worm screws extend perpendicularly to the rotational axis of the first gear.

* * * * *